US012607956B2

(12) United States Patent     (10) Patent No.:   US 12,607,956 B2

Kukitsu et al.     (45) Date of Patent:   Apr. 21, 2026

(54) IMAGE FORMATION DEVICE, PRINTING SYSTEM, AND PRINTING METHOD

(71) Applicant: TOSHIBA TEC KABUSHIKI KAISHA, Tokyo (JP)

(72) Inventors: Yutaka Kukitsu, Odawara Kanagawa (JP); Sou Miyazaki, Sunto Shizuoka (JP); Yusuke Hamada, Mishima Shizuoka (JP); Kouichirou Nishi, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/735,480

(22) Filed: Jun. 6, 2024

(65) Prior Publication Data

US 2025/0199446 A1    Jun. 19, 2025

(30) Foreign Application Priority Data

Dec. 15, 2023   (JP) ................................. 2023-212110

(51) Int. Cl.
    *G03G 15/00*     (2006.01)
    *G06Q 40/12*     (2023.01)

(52) U.S. Cl.
    CPC ..... *G03G 15/5091* (2013.01); *G03G 15/5016* (2013.01); *G03G 15/6502* (2013.01); *G06Q 40/128* (2013.12)

(58) Field of Classification Search
    CPC .. G03G 15/55; G03G 15/5016; G03G 15/502; G03G 15/6508
    See application file for complete search history.

(56) References Cited

U.S. PATENT DOCUMENTS

| | | | | |
|---|---|---|---|---|
| 7,957,020 | B2 * | 6/2011 | Mine ................. | G03G 15/5075 |
| | | | | 358/1.9 |
| 2006/0078859 | A1 * | 4/2006 | Mullin ............... | H04N 1/00042 |
| | | | | 434/219 |
| 2009/0168096 | A1 * | 7/2009 | Toda ..................... | G06F 3/1288 |
| | | | | 358/1.15 |
| 2022/0156017 | A1 | 5/2022 | Inoue | |
| 2022/0394139 | A1 * | 12/2022 | Kaneda .............. | H04N 1/00482 |

* cited by examiner

*Primary Examiner* — Jessica L Eley

(74) *Attorney, Agent, or Firm* — FOLEY & LARDNER LLP

(57) ABSTRACT

Processing circuitry of an image formation device transmits user identification information and device identification information to a server, receives an indication of a valid medium associated with the user identification information from the server, and determines whether the valid medium is contained in a tray. In response to a determination that the valid medium is not contained in the tray, the processing circuitry transmits an inquiry related to the valid medium to the server, receives, from the server, printing support information about another image formation device that contains the valid medium and is closest to a position indicated by position information associated with the device identification information, and outputs the printing support information to a user interface. The processing circuitry instructs a printer to perform image formation on the valid medium in response to a determination that the valid medium is contained in the tray.

19 Claims, 6 Drawing Sheets

| USER ID | COMMODITY ID | COMMODITY NAME | MEDIUM INFORMATION | PRINTED FLAG |
|---------|--------------|----------------|--------------------|--------------| 
|         |              |                |                    |              |
|         |              |                |                    |              |
|         |              |                |                    |              |
|         |              |                |                    |              |
| ⋮       | ⋮            | ⋮              | ⋮                  | ⋮            |

| MULTIFUNCTION PERIPHERAL ID | MULTIFUNCTION PERIPHERAL NAME | LOCATION | FIRST TRAY INFORMATION | SECOND TRAY INFORMATION | THIRD TRAY INFORMATION |
|-----------------------------|-------------------------------|----------|------------------------|-------------------------|------------------------|
|                             |                               |          |                        |                         |                        |
|                             |                               |          |                        |                         |                        |
|                             |                               |          |                        |                         |                        |
|                             |                               |          |                        |                         |                        |
| ⋮                           | ⋮                             | ⋮        | ⋮                      | ⋮                       | ⋮                      |

FIG. 6

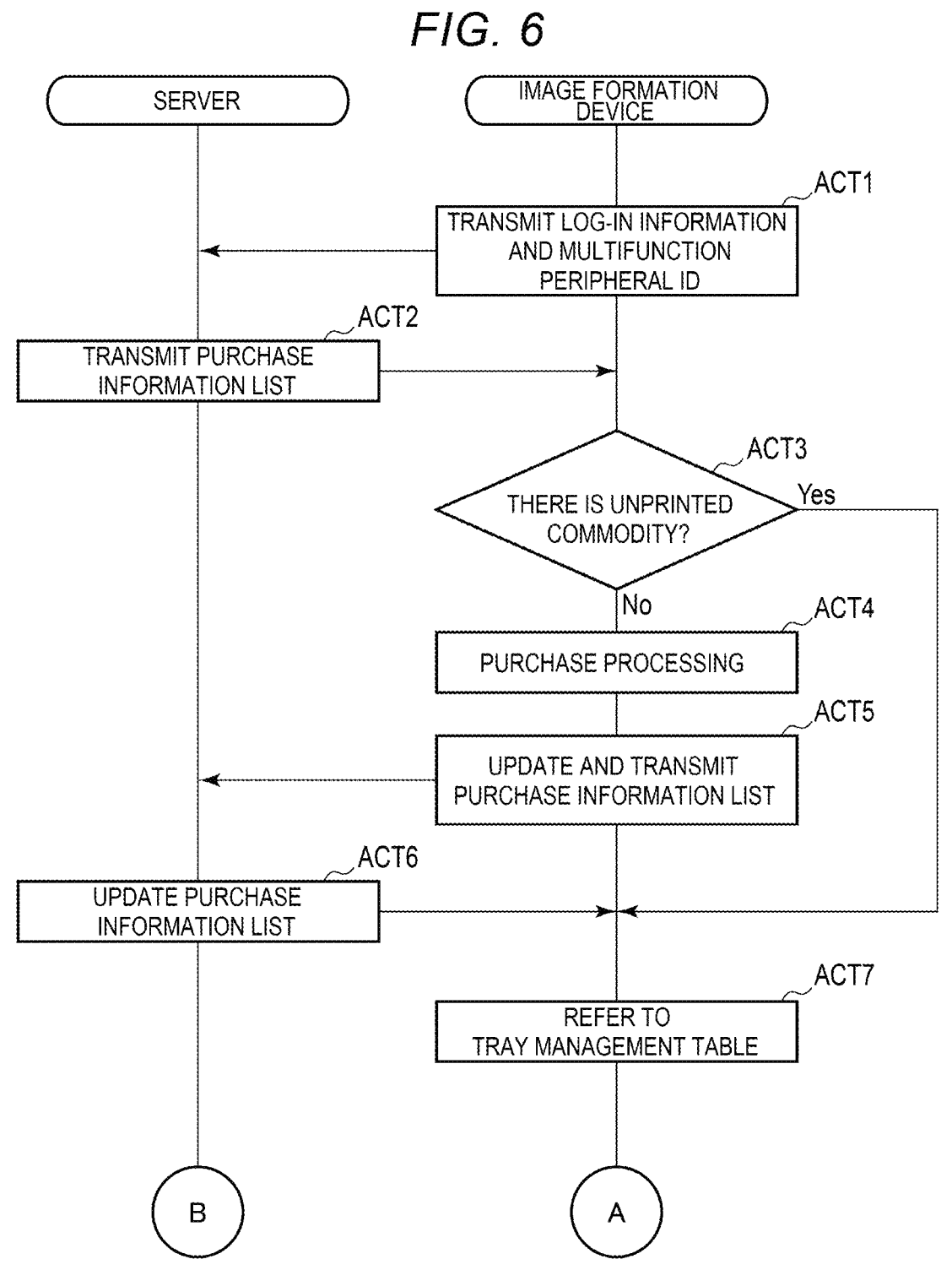

```
   ( SERVER )                    ( IMAGE FORMATION )
                                 (     DEVICE      )
                                                              ACT1
                                  ┌──────────────────────┐
                              <───┤ TRANSMIT LOG-IN       │
                                  │ INFORMATION           │
                                  │ AND MULTIFUNCTION     │
                                  │ PERIPHERAL ID         │
                                  └──────────────────────┘
        ACT2
  ┌──────────────────┐
  │ TRANSMIT PURCHASE │──────────────>
  │ INFORMATION LIST  │
  └──────────────────┘
                                            ACT3
                                      ╱◇╲
                                  ╱         ╲     Yes
                                ╱  THERE IS    ╲─────────┐
                                ╲  UNPRINTED   ╱         │
                                  ╲ COMMODITY?╱          │
                                      ╲◇╱                │
                                      │ No       ACT4    │
                                  ┌──────────────────┐   │
                                  │ PURCHASE         │   │
                                  │ PROCESSING       │   │
                                  └──────────────────┘   │
                                            ACT5          │
                                  ┌──────────────────┐   │
                              <───┤ UPDATE AND       │   │
                                  │ TRANSMIT PURCHASE│   │
                                  │ INFORMATION LIST │   │
                                  └──────────────────┘   │
       ACT6                                              │
  ┌──────────────────┐                                   │
  │ UPDATE PURCHASE  │──────────────>          <─────────┘
  │ INFORMATION LIST │
  └──────────────────┘
                                            ACT7
                                  ┌──────────────────┐
                                  │ REFER TO         │
                                  │ TRAY MANAGEMENT  │
                                  │ TABLE            │
                                  └──────────────────┘

( B )                           ( A )
```

THERE IS MEDIUM THAT IS NOT PRINTED YET

PLEASE LOG IN TO THE FOLLOWING
MULTIFUNCTION PERIPHERAL AND
RESUME PRINTING

MULTIFUNCTION PERIPHERAL B

IMAGE FORMATION DEVICE, PRINTING SYSTEM, AND PRINTING METHOD

CROSS-REFERENCE TO RELATED APPLICATION

This application is based upon and claims the benefit of priority from Japanese Patent Application No. 2023-212110, filed on Dec. 15, 2023, the entire contents of which are incorporated herein by reference.

FIELD

Embodiments described herein relate to an image formation device, a printing system, and a printing method.

BACKGROUND

There is known a technique of searching for information about an image formation device via a network and presenting a search result to a user. For example, the user can search for information about the image formation device stored in a cloud server and register a printing job based on a result thereof. However, when there are a plurality of image formation devices, the user may not determine which image formation device is close to a current location.

DESCRIPTION OF THE DRAWINGS

FIG. 4 is a schematic diagram illustrating an example of a purchase information list loaded in a main memory of the server;

FIG. 5 is a schematic diagram illustrating an example of an image formation device list;

FIG. 6 is a sequence diagram illustrating an example of an operation of the printing system;

DETAILED DESCRIPTION

Figure 1:
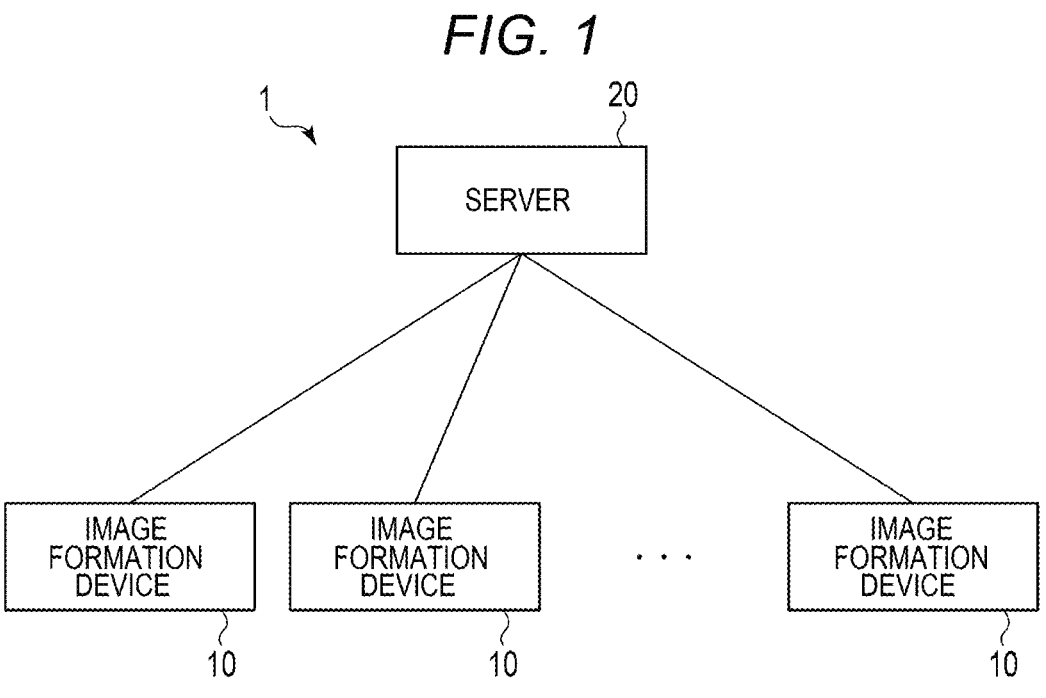
FIG. 1 is a block diagram illustrating a configuration example of a printing system according to an embodiment.

In general, according to one embodiment, an image formation device, a printing system, and a printing method for notifying information about a nearby image formation device that contains a desired medium are provided.

An image formation device includes: a tray configured to contain one or more types of media; a user interface configured to receive user identification information and output printing support information; a communication interface configured to communicate with a server; a memory configured to store device identification information; an image formation unit configured to form an image on the medium supplied from the tray; and a processor configured to instruct output of the printing support information or image formation. A processor transmits the user identification information and the device identification information to a server via the communication interface and receives a list of valid media associated with the user identification information from the server, determines whether a valid medium is contained in a tray, when the valid medium is not contained in the tray, transmits an inquiry related to the valid medium to the server via the communication interface, receives, from the server, printing support information about another image formation device that contains the valid medium and that is closest to a position indicated by position information associated with the device identification information, and outputs the printing support information to the user interface, and instructs image formation on the valid medium contained in the tray when the valid medium is contained in the tray.

Hereinafter, an embodiment will be described with reference to the drawings. In the description, components having substantially the same function and configuration are denoted by the same reference numerals. The following embodiment illustrates technical ideas. The embodiment does not specify a material, a shape, a structure, an arrangement, or the like of the components. The embodiment can be modified in various ways.

Configuration

FIG. 1 is a block diagram illustrating a configuration example of a printing system according to an embodiment. A printing system 1 is a system in which a commodity obtained by printing an image on a medium can be purchased. The medium is, for example, a medium on which an image can be printed, such as paper, cloth, sheets, seals, films, clear files, and magnet sheets. The printing system 1 includes a plurality of image formation devices 10 and a server 20.

The image formation device 10 is, for example, a device having a printing function and a user interface, such as a multifunction peripheral (MFP), a copier, or a printer. The printing function is a function of forming the image on the medium by using a recording material such as toner. The user interface receives an input from a user and outputs information to the user. In the present embodiment, a case in which the image formation device 10 is an MFP will be described as an example. The image formation device 10 receives the input from the user and allows the user to purchase the commodity. When printing can be executed, the image formation device 10 prints and outputs the commodity purchased by the user. When the printing cannot be executed, the image formation device 10 notifies the user of information about another image formation device 10 that can print the commodity purchased by the user. The image formation device 10 communicates with the server 20.

The server 20 manages information about the printing system 1. Details of information managed by the server 20 will be described later. The server 20 communicates with each of the plurality of image formation devices 10.

Figure 2:
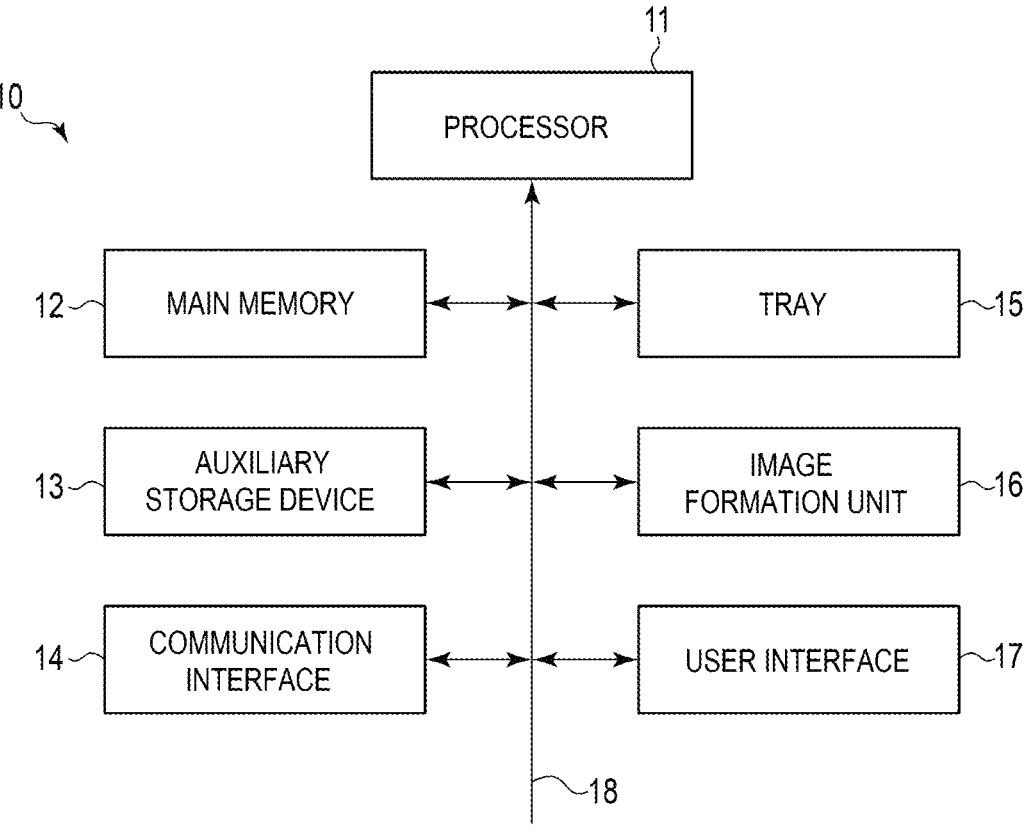
FIG. 2 is a block diagram illustrating a configuration example of an image formation device.

FIG. 2 is a block diagram illustrating a configuration example of the image formation device according to the embodiment. As illustrated in FIG. 2, the image formation device 10 includes a processor 11, a main memory 12, an auxiliary storage device 13, a communication interface 14, a tray 15, an image formation unit 16, a user interface 17, and a system bus 18. The system bus 18 includes an address bus, a data bus, a control signal line, and the like. The system bus 18 connects the processor 11, the main memory 12, the auxiliary storage device 13, the communication interface 14, the tray 15, the image formation unit 16, and the user interface 17. The processor 11, the main memory 12, and the auxiliary storage device 13 are connected via the system bus 18, thereby implementing a computer or controller of the image formation device 10.

The processor 11 (e.g., processing circuitry) corresponds to a central part of the above-described computer. The processor 11 controls units to implement various functions as the image formation device 10 according to an operating system or an application program. The processor 11 is, for example, a central processing unit (CPU).

The main memory 12 corresponds to a main memory portion of the above-described computer. The main memory 12 includes a non-volatile memory area and a volatile memory area. The main memory 12 stores an operating system or an application program in the non-volatile memory area. The main memory 12 may store data (e.g., instructions) necessary for the processor 11 to execute processing for controlling the units in the non-volatile or the volatile memory area. The main memory 12 uses the volatile memory area as a work area in which data is appropriately rewritten by the processor 11. The non-volatile memory area is, for example, a read only memory (ROM). The volatile memory area is, for example, a random access memory (RAM).

The auxiliary storage device 13 corresponds to an auxiliary storage portion of the above-described computer. The auxiliary storage device 13 stores data used when the processor 11 executes various types of processing, data generated in the processing executed by the processor 11, and the like. The auxiliary storage device 13 may store the above-described application program. The auxiliary storage device 13 is, for example, an electric erasable programmable read only memory (EEPROM) (registered trademark), a hard disk drive (HDD), a solid state drive (SSD), or the like.

The application program stored in the main memory 12 or the auxiliary storage device 13 includes a processing program described in connection with information processing executed by the image formation device 10. A method of installing the processing program in the main memory 12 or the auxiliary storage device 13 is not particularly limited. The processing program can be installed in the main memory 12 or the auxiliary storage device 13 by being recorded on a removable recording medium or being distributed by communication via a network. The recording medium may be in any form as long as the program can be recorded and is readable by a device, such as a CD-ROM or a memory card.

The communication interface 14 (e.g., a network interface, communication circuitry, etc.) communicates with an outside of the image formation device 10.

The tray 15 contains one or more types of media. The tray 15 includes a sensor that detects a size of the contained medium. The tray 15 supplies the contained medium to the image formation unit 16.

The image formation unit 16 (e.g., an image forming apparatus, a printer, etc.) forms the image on the medium supplied from the tray 15 (e.g., by printing).

The user interface 17 (e.g., an input and/or output device) is, for example, a touch panel or another type of display. The user interface 17 notifies the user of various types of information and receives the input from the user.

For example, the auxiliary storage device 13 stores a multifunction peripheral ID (e.g., an identification number) and a tray management table. The multifunction peripheral ID is a number sequence assigned to identify the image formation device 10 in the printing system 1. A unique multifunction peripheral ID is assigned to each of the image formation devices 10. The tray management table is a table (e.g., a database) in which a type of the medium contained in the tray 15 is registered. In the tray management table, the type of the medium is stored. The type of the medium may be determined based on the size of the medium contained in the tray 15 as detected by the sensor provided in the tray 15, or the type of the medium received via the user interface 17 is registered (e.g., manually entered by a user).

Figure 3:
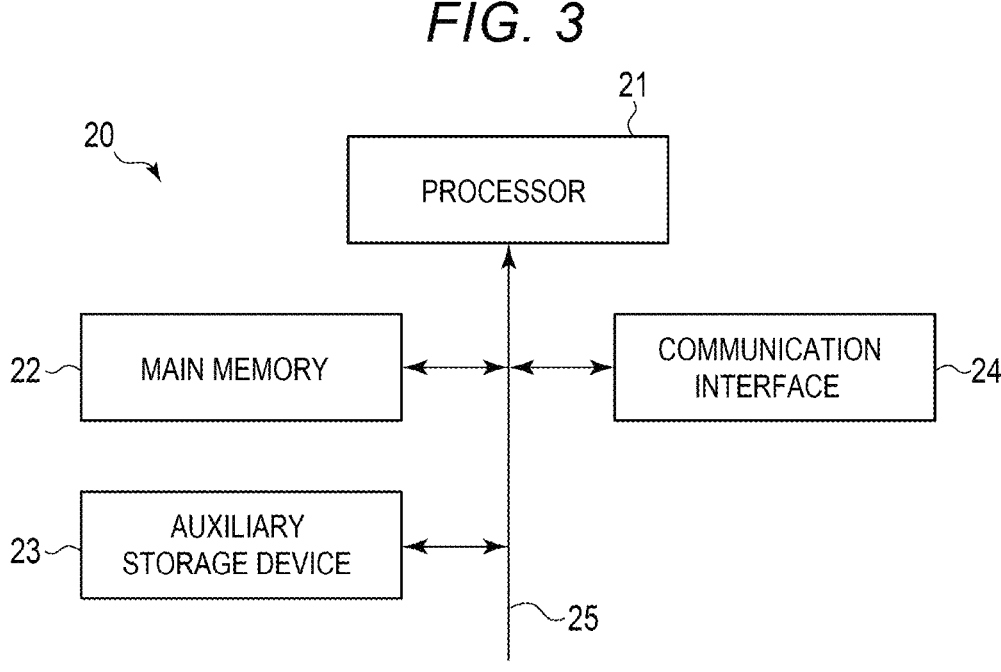
FIG. 3 is a block diagram illustrating a configuration example of a server.

FIG. 3 is a block diagram illustrating a configuration example of a server according to the embodiment. As illustrated in FIG. 3, the server 20 includes a processor 21, a main memory 22, an auxiliary storage device 23, a communication interface 24, and a system bus 25. The system bus 25 includes an address bus, a data bus, a control signal line, and the like. The system bus 25 connects the processor 21, the main memory 22, the auxiliary storage device 23, and the communication interface 24. The processor 21, the main memory 22, and the auxiliary storage device 23 are connected via the system bus 25, thereby implementing a computer (e.g., a controller, control circuitry, etc.) of the server 20.

The processor 21 corresponds to a central part of the above-described computer. The processor 21 controls units to implement various functions as the server 20 according to an operating system or an application program. The processor 21 is, for example, a CPU.

The main memory 22 corresponds to a main memory portion of the above-described computer. The main memory 22 includes a non-volatile memory area and a volatile memory area. The main memory 22 stores an operating system or an application program in the non-volatile memory area. The main memory 22 may store data necessary for the processor 21 to execute processing for controlling the units in the non-volatile or the volatile memory area. The main memory 22 uses the volatile memory area as a work area in which data is appropriately rewritten by the processor 21. The non-volatile memory area is, for example, a ROM. The volatile memory area is, for example, a RAM.

The auxiliary storage device 23 corresponds to an auxiliary storage portion of the above-described computer. The auxiliary storage device 23 stores data used when the processor 21 executes various types of processing, data generated in the processing executed by the processor 21, and the like. The auxiliary storage device 23 may store the above-described application program. The auxiliary storage device 23 is, for example, an EEPROM, an HDD, an SSD, or the like.

The communication interface 24 communicates with one or more components outside of the server 20.

As an example of data loaded in the main memory 22 of the server 20, a purchase information list 221 and an image formation device list 222 will be described in order.

FIG. 4 is a schematic diagram illustrating an example of the purchase information list loaded in the main memory of the server according to the embodiment. As illustrated in FIG. 4, the purchase information list 221 is a collection of data in which a user ID, a commodity ID, a commodity name, medium information, and a printed flag are stored.

The user ID (e.g., a user identification number) is a number sequence assigned to identify the user in the printing system 1. The commodity ID (e.g., a commodity identification number) is a number sequence assigned to identify the commodity in the printing system 1. The commodity name is a name of the commodity. The medium information is information indicating what the medium of the commodity is. The printed flag is a variable in which "1" is substituted when the commodity is printed and "0" is substituted when the commodity is unprinted.

FIG. 5 is a schematic diagram illustrating an example of the image formation device list loaded in the main memory of the server according to the embodiment. As illustrated in FIG. 5, the image formation device list 222 is a collection of data in which a multifunction peripheral ID, a multifunction peripheral name, a location, first tray information, second tray information, and third tray information are stored.

The multifunction peripheral ID (e.g., a multifunction peripheral identification number) corresponds to the multifunction peripheral ID stored in the auxiliary storage device 13 of the image formation device 10. The multifunction peripheral name is a name given to the image formation device 10 such that the user can identify the image formation device 10 in the printing system 1. The location is information indicating a position at which the image formation device 10 is provided. The location may be, for example, a combination of latitude and longitude, or may be information about a coordinate point at uniquely determined coordinates within a building or the like. The location is implemented such that a distance indicating how far two of the locations are apart can be calculated. Each of the first tray information to the third tray information is information indicating what the medium contained in the tray 15 is. In the present embodiment, a case is described as an example in which the tray 15 of the image formation device 10 contains three types of media, but the number of types of media that can be contained in the tray 15 is not limited thereto. The number of tray information included in the image formation device list 222 is set according to the number of types of media that can be contained in the tray 15.

Operation

Figure 7:
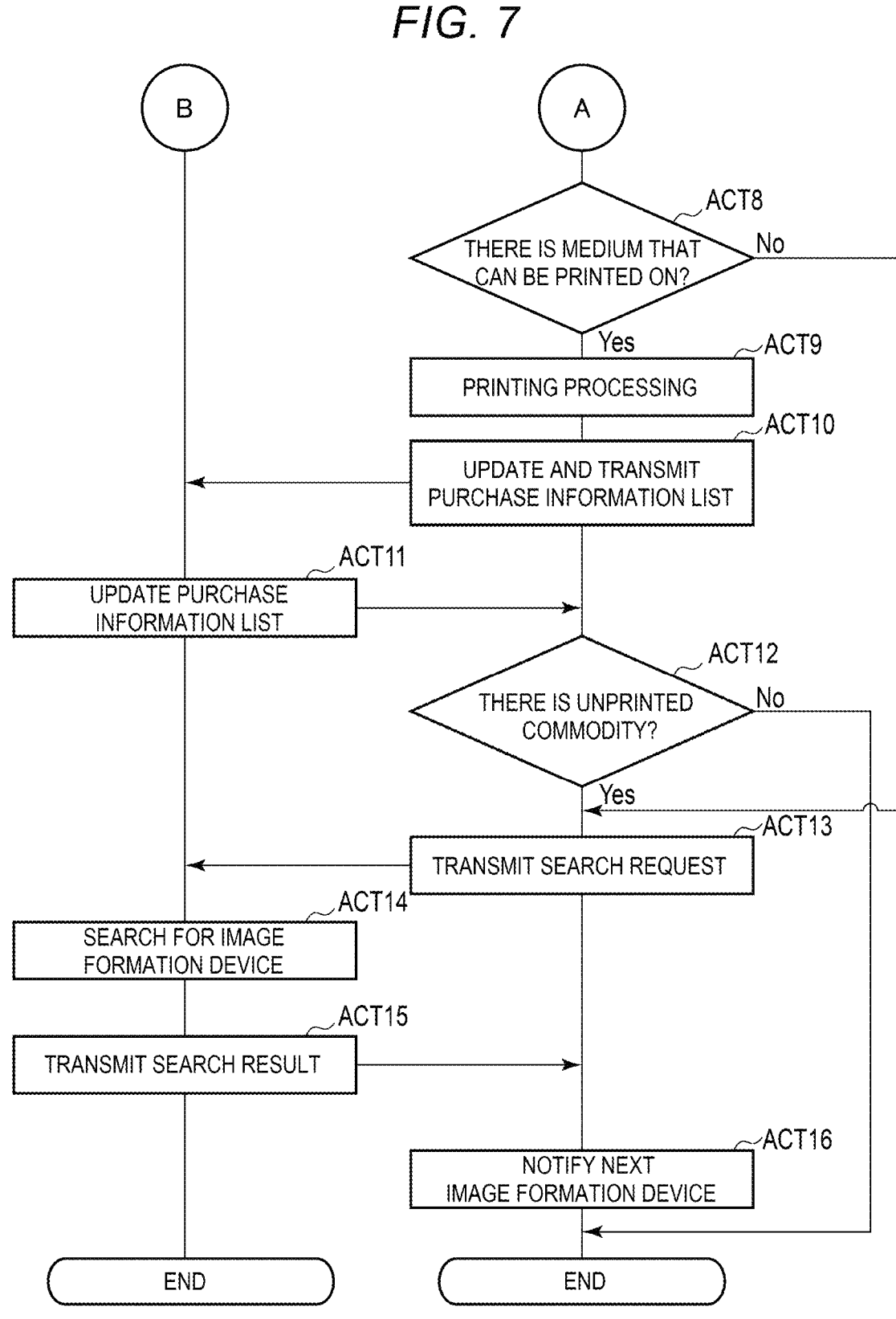
FIG. 7 is a sequence diagram illustrating an example of an operation of the printing system.

FIGS. 6 and 7 are sequence diagrams illustrating an example of an operation of the printing system according to the embodiment. The operation of the printing system 1 according to the embodiment will be described with reference to FIGS. 6 and 7.

When the user inputs log-in information to the image formation device 10, the processor 11 of the image formation device 10 transmits the log-in information and the multifunction peripheral ID (ACT 1). Specifically, the processor 11 transmits the log-in information received by the user interface 17 and the multifunction peripheral ID stored in the auxiliary storage device 13 to the server 20 via the communication interface 14. The log-in information includes at least user identification information. The user identification information may be a user ID or another information uniquely corresponding to the user ID.

The processor 21 of the server 20 that receives the log-in information and the multifunction peripheral ID transmits the purchase information list (ACT 2). Specifically, the processor 21 receives the log-in information and the multifunction peripheral ID via the communication interface 24. The processor 21 specifies the image formation device 10 as a communication destination based on the received multifunction peripheral ID. The processor 21 verifies the received log-in information and specifies the user ID of the user who logs in. The processor 21 extracts data corresponding to the user ID of the user who logs in from the purchase information list. The processor 21 transmits the extracted purchase information list to the image formation device 10 via the communication interface 24.

The processor 11 of the image formation device 10 that receives the purchase information list determines whether there is an unprinted commodity (ACT 3). Specifically, the processor 11 loads the received purchase information list in the main memory 12. Then, the processor 11 determines whether there is a commodity whose printed flag is "0" in the received purchase information list. If there is an unprinted commodity, that is, if there is a commodity whose printed flag is "0" (Yes in ACT 3), processing in ACT 7 to be described later is executed.

If there is no unprinted commodity, that is, if there is no commodity whose printed flag is "0" (No in ACT 3), the processor 11 executes purchase processing (ACT 4). Specifically, the processor 11 controls the user interface 17 to allow the user to purchase the commodity. The user purchases a desired commodity from commodities handled by the printing system 1, regardless of the types of media contained in the currently logged-in image formation device. The user purchases one commodity or purchases a plurality of commodities at the same time regarding the commodities handled by the printing system 1. At the time of purchase, settlement of price is performed by online electronic money settlement using, for example, a two-dimensional bar code and a smartphone. The user reads the two-dimensional bar code for settlement displayed on the user interface 17 with a settlement application of the smartphone.

The settlement application transmits the read two-dimensional bar code and information about the user registered in the settlement application to an electronic money server and performs settlement processing. When the settlement processing is completed, the electronic money server transmits a notification that the settlement is completed to each of the image formation device 10 and the smartphone of the user. In response to this notification, the image formation device 10 detects the completion of the settlement and completes the purchase processing. Cash may be used for the settlement of the price. In this case, the image formation device 10 further includes an accounting unit (e.g., a point of sale system) capable of inputting and withdrawing cash.

When the purchase processing is completed, the processor 11 updates and transmits the purchase information list (ACT 5). Specifically, the processor 11 updates the purchase information list in the main memory 12 based on the purchase of the user in ACT 4. Then, the processor 11 transmits the updated purchase information list to the server 20 via the communication interface 14.

The processor 21 of the server 20 that receives the purchase information list updates the purchase information list (ACT 6). Specifically, the processor 21 updates the purchase information list in the main memory 22 based on the received purchase information list. When the update is completed, the processor 21 controls the communication interface 24 to transmit an update completion notification to the image formation device 10.

When receiving the update completion notification, the processor 11 of the image formation device 10 refers to the tray management table (ACT 7). Specifically, the processor 11 specifies the type of the medium contained in the tray 15 based on the tray management table.

When the type of the medium is specified, the processor 11 determines whether there is a medium that can be printed on (ACT 8). Specifically, the processor 11 determines whether there is a commodity whose corresponding medium is contained in the tray 15 among unprinted commodities included in the purchase information list in the main memory 12. If there is no medium that can be printed on (No in ACT 8), processing in ACT 13 to be described later is executed.

When there is a medium that can be printed on (Yes in ACT 8), the processor 11 executes printing processing (ACT 9). Specifically, the processor 11 controls the tray 15 and the image formation unit 16 to form the image on the medium.

When the printing processing is completed, the processor 11 updates and transmits the purchase information list (ACT 10). Specifically, the processor 11 updates the printed flag in the purchase information list in the main memory 12 based on the printing processing in ACT 9. Then, the processor 11 transmits the updated purchase information list to the server 20 via the communication interface 14.

The processor 21 of the server 20 that receives the purchase information list updates the purchase information list (ACT 11). Specifically, the purchase information list in the main memory 22 is updated based on the received purchase information list. When the update is completed, the processor 21 controls the communication interface 24 to transmit an update completion notification to the image formation device 10.

When receiving the update completion notification, the processor 11 of the image formation device 10 determines whether there is an unprinted commodity (ACT 12). Specifically, the processor 11 determines whether there is a commodity whose printed flag is "0" in the purchase information list in the main memory 12.

If there is an unprinted commodity, that is, if there is a commodity whose printed flag is "0" (Yes in ACT 12), or if there is no medium that can be printed on in ACT 8 (No in ACT 8), the processor 11 transmits a search request (ACT 13). Specifically, the processor 11 transmits, to the server 20 via the communication interface 14, the search request for requesting to search for the image formation device 10 that can print on a medium corresponding to the unprinted commodity.

The processor 21 of the server 20 that receives the search request searches for an image formation device (ACT 14). Specifically, the processor 21 uses the image formation device list 222 in the main memory 22 to search for the image formation device 10 that contains the medium corresponding to the unprinted commodity and that is closest to the image formation device 10 that is currently logged in to. Specifically, the processor 21 refers to the first tray information to the third tray information of each image formation device 10 registered in the image formation device list 222 to extract the image formation device 10 containing the medium corresponding to the unprinted commodity. Further, the processor 21 calculates the distances from the image formation device 10 that is currently logged in to each of the extracted image formation devices 10 by using information about the location. Then, the processor 21 sets the image formation device 10 having the shortest calculated distance as a search result.

When the search is completed, the processor 21 transmits the search result (ACT 15). Specifically, the processor 21 transmits the search result to the image formation device 10 via the communication interface 24. The search result to be transmitted may be referred to as printing support information. The printing support information includes at least a name of the image formation device 10.

The processor 11 of the image formation device 10 that receives the search result notifies the user of the next image formation device (ACT 16). Specifically, the processor 11 controls the user interface 17 to notify the user of information about the closest image formation device 10 that can print an unprinted commodity. The information to be notified includes at least the name of the image formation device 10.

When the next image formation device is notified, that is, when the processing in ACT 16 is completed, or if there is no unprinted commodity in ACT 12 (No in ACT 12), the series of processing illustrated in FIGS. 6 and 7 ends.

Figure 8:
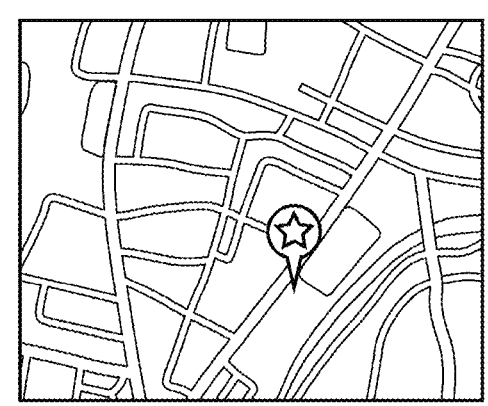
FIG. 8 is a diagram illustrating an example of a notification screen of the image formation device.

FIG. 8 is a diagram illustrating an example of a notification screen of the image formation device according to the embodiment. FIG. 8 illustrates an example of a screen displayed on the user interface 17 in ACT 16 described above. In the example illustrated in FIG. 8, on the screen, a name "multifunction peripheral B", which is the name of the image formation device 10, a map indicating a position of the image formation device 10 are displayed together with sentences of "there is medium that is not printed yet", "please log in the following multifunction peripheral and resume printing". In this way, the processor 11 may notify the user of information indicating the position of the image formation device 10 in addition to the name of the image formation device 10 in ACT 16. That is, the printing support information may include the information indicating the position of the image formation device 10 in addition to the name of the image formation device 10.

Effects

In this way, according to the embodiment, when the user logs in to the image formation device 10 in the printing system 1, the printing is performed on the printable commodity. When an unprinted commodity remains, the user is notified of the nearby image formation device 10 that can print the commodity. Accordingly, the user can log in to the next image formation device 10 without searching for the image formation device 10 that can print an unprinted commodity.

Further, according to the embodiment, the user can purchase the commodity in the image formation device 10 in the printing system 1. At the time of the purchase, the user can purchase one or a plurality of desired commodities without being limited by what types of media are contained in the image formation device 10 to which the user logs in currently. For example, when the printing system is independent for each image formation device 10, that is, when only the commodity corresponding to the medium contained in the image formation device 10 can be purchased, the user searches for the image formation device 10 capable of printing the desired commodity. In addition, in such a system, when the commodity is printed by the plurality of image formation devices 10, the user needs to purchase the commodity for each image formation device 10. In contrast, according to the embodiment, the user can perform the purchase uniformly without searching for the image formation device 10.

Further, according to the embodiment, in the printing system 1, when the user is notified of the nearby image formation device 10, at least the name of the image formation device 10 is notified. As a method for determining the image formation device 10, for example, the multifunction peripheral ID may be used. However, since the multifunction peripheral ID is a number sequence, for example, the multifunction peripheral ID may be considered to be hard to recognize at a glance when having a large number of digits. In contrast, according to the embodiment, the user is notified of the name of the image formation device 10, and the next image formation device 10 can be easily determined.

Other Modifications

When searching for the image formation device 10 that can print an unprinted commodity and that is closest to the image formation device 10 that is currently logged in, the processor 21 may consider whether one or a plurality of unprinted commodities can be printed. Specifically, for example, a commodity using a first medium and a commodity using a second medium are included in the unprinted commodities. At this time, as the closest image formation device 10 that can print the unprinted commodity, the processor 21 may search for the image formation device 10 that contains the first medium and does not contain the second medium, the image formation device 10 that contains the second medium and does not contain the first medium, or the image formation device 10 that contains the first medium and contains the second medium.

The processor 21 may output the plurality of image formation devices 10 as a search result when searching for the image formation device 10 that can print an unprinted commodity and is closest to the image formation device 10 that is currently logged in. For example, it is assumed that the image formation device 10 that can print an unprinted commodity and that is closest is provided in a certain building. When there are a plurality of the image formation devices 10 that can print an unprinted commodity in the building, the processor 21 may output the plurality of image formation devices 10 as the search result as the closest image formation device 10 that can print the unprinted commodity. In this case, for example, printing support information may include a guidance diagram in the building. For example, even when there are a plurality of image formation devices 10 that can print the unprinted commodity within a certain distance range, the processor 21 may output the plurality of image formation devices 10 as the search result as the closest image formation device 10 that can print the unprinted commodity.

In addition to the closest image formation device 10 that can print the unprinted commodity, the processor 21 may output, as the search result, the image formation devices 10 that can print the unprinted commodity and that is the second and subsequent closest. In this case, for example, when a map is displayed on the user interface 17, the image formation device 10 that receives the printing support information may perform a display by indicating the closest image formation device 10 with a first icon and indicating the second and subsequent closest image formation devices 10 with second icons such that differences can be seen on the map. The first icon and the second icon may have different sizes, different colors, or different sizes and colors.

In the embodiment described above, a case is described as an example in which each of the multifunction peripheral ID, the user ID, and the commodity ID is a number sequence. The multifunction peripheral ID, the user ID, and the commodity ID are not limited to a number sequence. The multifunction peripheral ID, the user ID, and the commodity ID may be a character string or a combination of a character and a number.

In the embodiment described above, a case is described as an example in which the printed flag is a variable in which "1" is substituted when the printing is completed and "0" is substituted when the printing is not performed. The printed flag is not limited thereto. The printed flag may be, for example, a character string as long as two states of printed and unprinted can be determined.

While a certain embodiment has been described, the embodiment has been presented by way of example only and is not intended to limit the scope of the exemplary embodiments. The novel embodiment can be implemented in various other forms, and various omissions, substitutions, and modifications can be made without departing from the gist of the disclosure. The embodiment and the modifications thereof are included in the scope and the gist of the exemplary embodiments, and are included in a scope of the exemplary embodiments disclosed in the claims and equivalents thereof.

What is claimed is:

1. An image formation device comprising:
a tray;
a user interface configured to receive user identification information;
a communication interface configured to communicate with a server;
a memory configured to store device identification information;
a printer configured to form an image on a medium supplied from the tray; and
processing circuitry configured to:
transmit the user identification information and the device identification information to the server;
receive an indication of a valid medium associated with the user identification information from the server through the communication interface;
determine whether the valid medium is contained in the tray;
in response to a determination that the valid medium is not contained in the tray, (a) transmit an inquiry related to the valid medium to the server, (b) receive, from the server through the communication interface, printing support information about another image formation device that contains the valid medium and that is closest to a position indicated by position information associated with the device identification information, and (c) output the printing support information to the user interface; and
instruct the printer to perform image formation on the valid medium in response to a determination that the valid medium is contained in the tray.

2. The image formation device of claim 1, wherein the valid medium is a first valid medium, and wherein the indication of the first valid medium is a list of valid media including the first valid medium.

3. The image formation device of claim 2, wherein:
the user interface is further configured to receive purchase information; and
the processing circuitry is configured to update the list of the valid media based on the purchase information and transmit the updated list of the valid media to the server through the communication interface.

4. The image formation device of claim 1, wherein the printing support information includes a name of the other image formation device that contains the valid medium.

5. The image formation device of claim 1, wherein the user interface includes a display configured to display the printing support information.

6. The image formation device of claim 5, wherein the display is configured to display the printing support information including a map indicating a position of the other image formation device that contains the valid medium.

7. A printing system comprising:
an image formation device; and
a server configured to communicate with the image formation device, wherein:
the image formation device includes:
a tray;
a user interface configured to receive user identification information;
a first communication interface configured to communicate with the server;
a memory configured to store device identification information;
a printer configured to form an image on a medium supplied from the tray; and
first processing circuitry configured to:
transmit the user identification information and the device identification information to the server;

receive an indication of a valid medium associated with the user identification information from the server through the first communication interface;

determine whether the valid medium is contained in the tray;

in response to a determination that the valid medium is not contained in the tray, (a) transmit an inquiry related to the valid medium to the server, (b) receive, from the server through the first communication interface, printing support information about another image formation device that contains the valid medium, the printing support information including a position of the other image forming device that contains the valid medium, and (c) output the printing support information, including the position of the other image forming device, to the user interface; and instruct the printer to perform image formation on the valid medium in response to a determination that the valid medium is contained in the tray; and the server includes:

a second communication interface configured to communicate with the image formation device; and second processing circuitry configured to:

receive the user identification information and the device identification information from the image formation device;

transmit the indication of the valid medium associated with the user identification information to the image formation device through the second communication interface;

receive the inquiry from the image formation device; and transmit the printing support information based on the inquiry to the image formation device through the second communication interface.

8. The printing system of claim 7, wherein the valid medium is a first valid medium, and wherein the indication of the first valid medium is a list of valid media including the first valid medium.

9. The printing system of claim 8, wherein:

the user interface is further configured to receive purchase information; and the first processing circuitry is configured to update the list of the valid media based on the purchase information and transmit the updated list of the valid media to the server through the first communication interface.

10. The printing system of claim 7, wherein the printing support information includes a name of the other image formation device that contains the valid medium.

11. The printing system of claim 7, wherein the user interface includes a display configured to display the printing support information.

12. The printing system of claim 11, wherein the display is configured to display the printing support information including a map indicating a position of the other image formation device that contains the valid medium.

13. The printing system of claim 7, wherein the other image formation device contains the valid medium and that is closest to a position indicated by position information associated with the device identification information.

14. The printing system of claim 7, wherein the second processing circuitry of the server is configured to generate the indication of the valid medium based on the user identification information.

15. The printing system of claim 7, wherein the second processing circuitry of the server is configured to determine the printing support information based on the device identification information.

16. The printing system of claim 15, wherein the second processing circuitry of the server is configured to determine the printing support information based on a distance between the image formation device and the other image formation device.

17. The printing system of claim 7, wherein the second processing circuitry of the server is configured to determine the printing support information based on a determination that the other image formation device contains the valid medium and is closest to a position indicated by position information associated with the device identification information.

18. A printing method comprising:

transmitting user identification information and device identification information associated with an image formation device to a server;

receiving a list of valid media associated with the user identification information from the server through a communication interface, the list of valid media including a first valid medium;

determining whether a tray of the image formation device contains the first valid medium;

in response to a determination that the tray does not contain the first valid medium, (a) transmitting an inquiry related to the first valid medium to the server, (b) receiving, from the server, printing support information about another image formation device that contains the first valid medium and that is closest to a position indicated by position information associated with the device identification information through the communication interface, and (c) outputting the printing support information to a user interface; and instructing a printer of the image formation device to perform image formation on the first valid medium in response to a determination that the tray contains the first valid medium.

19. The printing method of claim 18, wherein the user interface is a display of the image formation device.

* * * * *